United States Patent [19]

Netzel

[11] Patent Number: 4,669,738
[45] Date of Patent: Jun. 2, 1987

[54] INTERNALLY INSTALLABLE PACKAGE SEAL

[75] Inventor: James P. Netzel, Skokie, Ill.

[73] Assignee: John Crane-Houdaille, Inc., Morton Grove, Ill.

[21] Appl. No.: 727,061

[22] Filed: Apr. 25, 1985

[51] Int. Cl.[4] .............................................. F16J 15/34
[52] U.S. Cl. ....................................... 277/40; 277/50; 277/59; 277/65
[58] Field of Search ............................... 277/35, 38–43, 277/47, 50, 65, 59, 81 R

[56] References Cited

U.S. PATENT DOCUMENTS

| | | |
|---|---|---|
| 2,321,871 | 6/1943 | Stevenson ............................. 277/38 |
| 2,911,240 | 11/1959 | Boutros et al. ..................... 277/39 X |
| 3,301,191 | 1/1967 | Warren ............................... 277/41 X |
| 3,410,566 | 11/1968 | Wiese ................................. 277/38 X |
| 3,743,302 | 7/1973 | Bach et al. .......................... 277/38 X |
| 3,796,507 | 3/1974 | Smykal et al. ..................... 277/39 X |
| 3,877,706 | 4/1975 | Haas et al. ............................. 277/41 |
| 3,941,395 | 3/1976 | Ball et al. ............................. 277/41 |
| 4,377,290 | 3/1983 | Netzel .................................. 277/38 |

FOREIGN PATENT DOCUMENTS 652049 4/1951 United Kingdom ................. 277/43

Primary Examiner—Robert S. Ward
Attorney, Agent, or Firm—Robert V. Jambor

[57] ABSTRACT

A package seal particularly suited to pumps or other applications having a drive shaft which terminates internally of a housing at its connection to the impeller or fluid working element. In such an apparatus partial disassembly of the components provides access to the free end of the drive shaft. The package seal has an outer member adapted to be disposed coaxially on the rotatable shaft and pass through the housing bore. The outer member includes a mounting flange adapted to be secured in the interior of the housing and a cylindrical body adapted to extend axially along the rotatable shaft from the seal flange to the exterior of the housing. The cylindrical body houses the seal components which provide a fluid tight seal between the housing and shaft.

12 Claims, 2 Drawing Figures

INTERNALLY INSTALLABLE PACKAGE SEAL

BACKGROUND AND SUMMARY OF THE INVENTION

The present invention relates to a package seal utilized to provide a fluid tight seal between a rotatable shaft and a housing. The package seal is mounted interiorly of the housing and extends to the exterior along the shaft.

Early solutions to the problem of sealing a housing and a relatively rotating shaft utilized packing in a stuffing box. Later, face seals, were utilized which were sized to fit within the counter bore in the housing intended to receive packing material. More recently package seals have been developed which are positioned on the shaft exteriorly of the housing. Since such seal arrangements are not limited to the size constraints of the housing, larger and more durable seal components can be employed.

An example of a package seal is disclosed in U.S. Pat. No. 4,377,290. The package seal is designed to slide onto the shaft and is fixed to the exterior of the housing through a gland plate bolted to the housing. This package seal offers significant advantages over the prior art.

SUMMARY OF THE INVENTION

The package seal of the present invention is particularly suited to pump or other applications having a drive shaft which terminates internally of the housing at its connection to the impeller or fluid working element. In such an apparatus partial disassembly of the components provides access to the free end of the drive shaft. Minimal disassembly of the housing and removal of the impeller permits axial translation of the package seal assembly onto the shaft for connection to the housing.

The package seal has an outer member adapted to be disposed coaxially on the rotatable shaft and pass through the housing bore. The outer member includes a mounting flange adapted to be secured in the interior of the housing and a cylindrical body adapted to extend axially along the rotatable shaft from the seal flange to the exterior of the housing. The cylindrical body houses the seal components which provide a fluid tight seal between the housing and shaft.

DETAILED DESCRIPTION OF THE ILLUSTRATED EMBODIMENT

In the accompanying drawing there is illustrated a package seal embodying the principles of the present invention. Advantageously, the seal of the present invention is intended for use with an assembly having a shaft that terminates interiorly of the housing, and, which, upon partial disassembly of the housing provides access to the shaft end. Illustrated in the context of a centrifugal pump, the inventive package seal is readily installed, removed, and replaced by sliding the seal package onto the free end of the rotatable shaft and reassembling the housing components.

Figure 1:
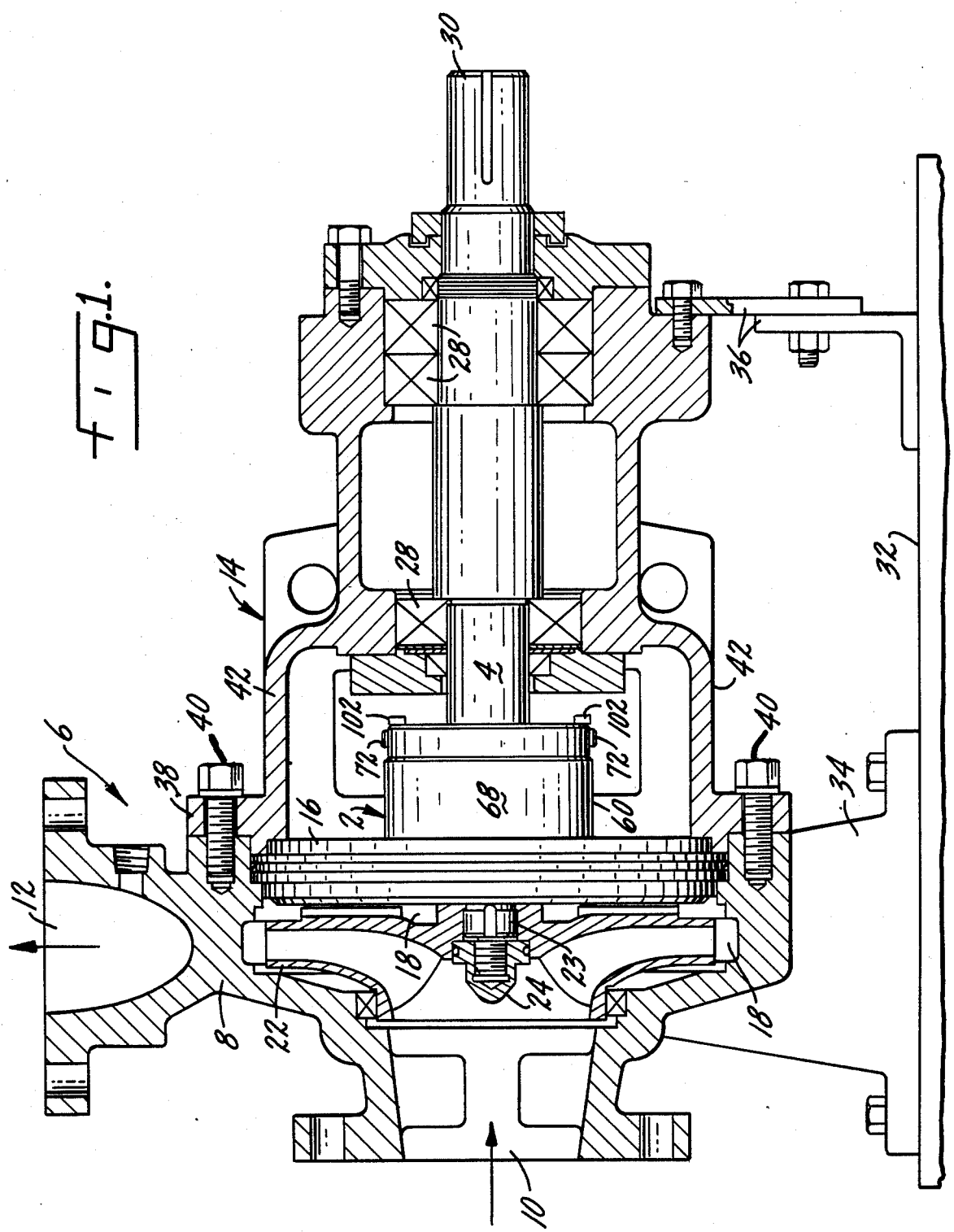
FIG. 1 is a sectional view of a centrifugal pump assembly incorporating a package seal embodying the principles of the present invention.

Referring now to FIG. 1, there is illustrated a centrifugal pump assembly generally designated 6, which includes a volute housing 8, bearing housing 14, back plate 16, rotatable drive shaft 4, and impeller 22. A package seal 2 embodying the principles of the present invention is incorporated in the assembly to seal against leakage of the fluid being pumped along relatively rotatable shaft 4.

Volute housing 8 defines a fluid inlet 10 and a fluid outlet 12, and is shaped to define an interior pump cavity 18. Volute housing 8 is secured to flange 38 of bearing housing 14 by bolts 40. Housing 8 and housing 14 are shaped to define annular recess 37.

Back plate 16 is annular and defines the posterior wall of pump cavity 18. Back plate 16 includes an outer peripheral flange 41 removably clamped in recess 37 in fluid tight relation. An "O" ring 39 may be conveniently used to provide the fluid tight seal. Back plate 16 further includes inner annular flange 44 defining inner bore 46, which surrounds shaft 4. A ring of bolt holes 48 extend through flange 44 for reasons as will be explained. Interiorly of cavity 18, back plate flange 44 is provided with a recess or counter bore 47 facing inward of the cavity 18.

Drive shaft 4 is rotatably supported in bearing housing 14 upon bearings 28. It includes portion 20 which extends through bore 46 in back plate 16 and terminates in an end 23 disposed in pump cavity 18. Impeller 22 is disposed within pump cavity 18 and is removably secured to shaft end 23 by threaded impeller nut 24. Opposite end 30 of shaft 4 is adapted to receive power from any suitable source such as an electric motor (not shown).

The volute housing 8, bearing housing 14 and drive motor are all removably mounted on a base plate 32. As shown in FIG. 1, the volute housing 8 has an integral leg 34 bolted to the base plate 32. The bearing housing 14 is bolted to the base plate 32 through plate members 36.

As best seen in FIG. 1, the bearing housing 14 also includes a plurality of arms 42 extending axially from the flange 38. The arms 42 are spaced substantially equidistant from each other around the circumference of the flange 38. Between the arms 42, there is sufficient space so as to provide access to the exterior of package seal 2 for reasons as will be explained.

Figure 2:
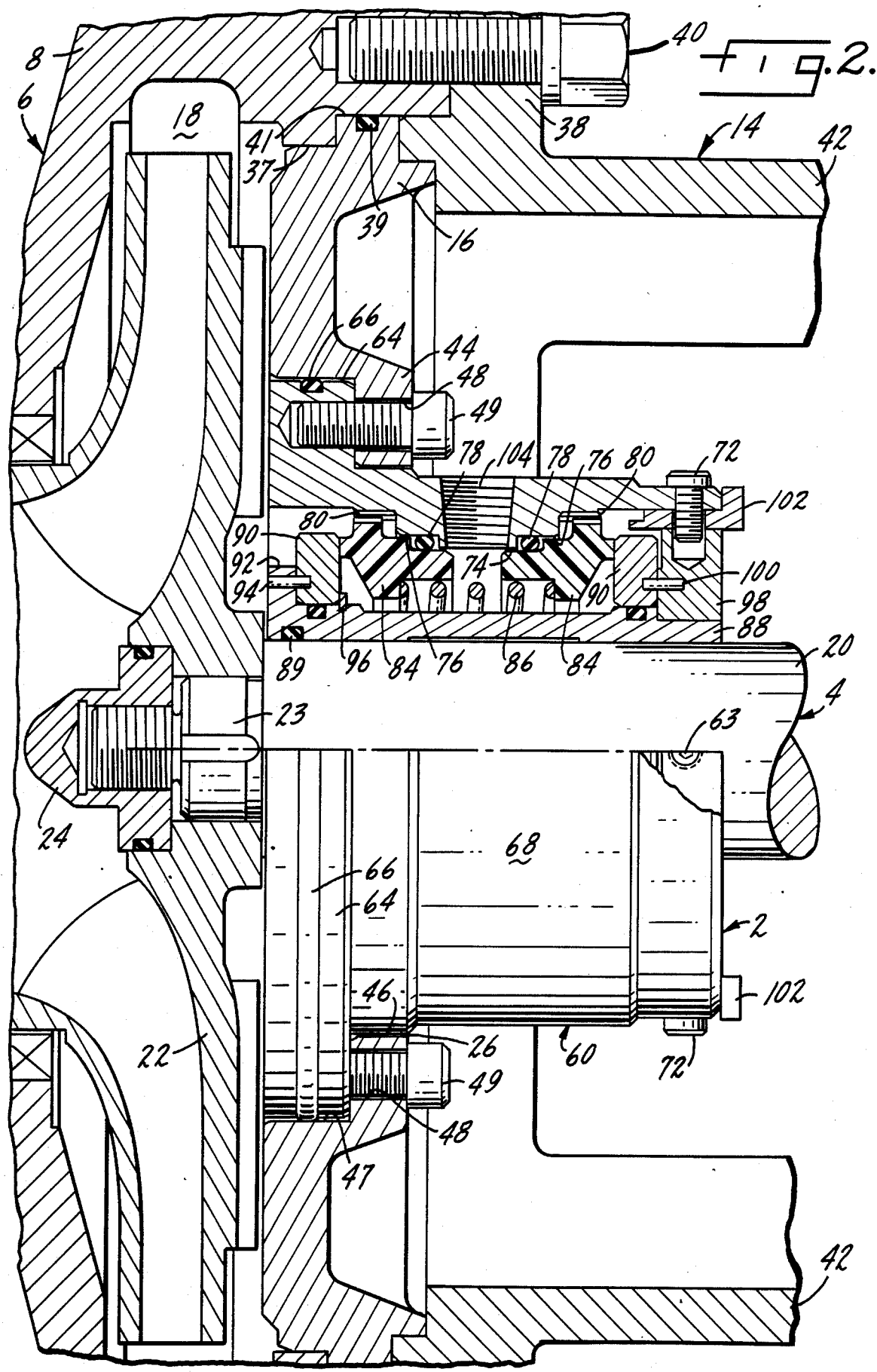
FIG. 2 is an enlarged view, partially in section, of a portion of the centrifugal pump assembly of FIG. 1, with the package seal and back plate shown in partial cross-section.

In accordance with the present invention, as shown in FIG. 2, the package seal 2 is mounted in surrounding relation to the shaft 4. The structure of the package seal 2 is adapted to seal the cavity 18 of the volute housing 2 with respect to the shaft 4. The interior structure of the package seal 2 may be substantially the same as that disclosed in U.S. Pat. No. 4,377,290, the disclosure of which is incorporated by reference herein. The illustrated package seal 2 includes an outer member 60 having an interior surface machined to define generally symmetrical surfaces on opposite sides of a land 74. Stepped annular surfaces 76, 76 immediately adjacent the land 74 are machined to receive secondary seals 78, 78 shown in the form of elastomeric "O" rings. Outside of the stepped annular surfaces 76, 76 are stepped surfaces which receive retaining bands 80, 80 having lugs which engage slots in a pair of primary seal rings 84, 84 to prevent their rotation.

The primary seal rings 84, 84 are identical to one another and are in a back-to-back relation, and have outwardly facing radial sealing faces. As illustrated, the primary seal rings 84, 84 have reduced diameters to sealingly engage the secondary seals 78, 78. In addition, the internal surfaces of the primary rings 84, 84 are stepped to define abutments which receive the bias of a spring 86.

The package seal 2 also includes an inner sleeve member 88 which carries the rotating components of the seal. The inner sleeve member 88 fits around the shaft 4 and is sealed with respect to the shaft by means of an "O" ring 89. The inner sleeve member 88 and outer member 60 are long enough to encapsulate all of the rotating components of the seals.

The rotating components of the seal include a pair of mating rings 90, 90 which have radially extending sealing surfaces to mate with similar surfaces on the primary seal rings 84, 84 all of which are of equal outer diameters. The left mating ring 90 is retained in place by a flange 92, a pin 94, and a "spirolox" snap ring 96. The right mating ring 90 is retained in place by a collar 98 and constraining pin 100. The collar 98 is held in place by a series of set screws 63 which lock sleeve 88 to shaft 4.

To center the inner sleeve member 88 relative to the outer member 60, a plurality of space tabs 102 are inserted between the outer member 60 and the collar 98. The bolts 72 are screwed through the outer member 60 and tabs 102 to hold the components in a centered package. When so assembled, the unit may be pretested by admitting fluid under pressure through a tap 104 into the chamber defined by the two end-face seals. The absence of leakage confirms proper assembly. As in the case of the seal package disclosed in U.S. Pat. No. 4,377,290, after installation of the seal package into a pump, bolts 72 and tabs 102 are removed to permit the seal components to operate.

It should also be understood that the interior structure of the package seal here illustrated is by way of example. Any suitable arrangement of interior components may be utlilized without departing from the scope of the invention. For example, instead of the double seal shown in the illustrated embodiment, a single seal may be employed. The invention here concerns the seal package and its manner of connection to the housing, whether a pump housing or other fluid handling apparatus.

The outer member 60 of the seal package includes enlarged annular flange 64 which fits into counterbore 47. The flange 64 is sealed with respect to the counterbore 47 of flange 44 by means of an "O" ring 66. The flange 64 has a diameter greater than that of the central bore 46, and has a plurality of threaded holes adapted to receive bolts 49 which secure the package seal 2 to the back plate 16.

From the seal flange 64, the outer member 60 has a cylindrical body 68 which extends through the central bore 46 to the exterior of the volute housing 8. The cylindrical body 68 has a diameter less than that of the central bore 46, so that the package seal 2 may be pushed or pulled through the central bore from the free interior end 23 of the shaft 4. The end of cylindrical body 60 furthest from flange 64 is of a decreased diameter, so that bolts 72 may pass through central bore 46 and not interfere with the installation or removal of the package seal 2. The bolts 72 may also be made with relatively flat heads to facilitate installation and removal of the package seal.

Removal and replacement of the package seal 2 is readily accomplished with the illustrated embodiment. Volute housing 8 is unbolted from base plate 32 and the bolts 40 connecting volute housing 8 and bearing housing 14 are removed. The inlet 10 and outlet 12 of the volute housing are disconnected from associated piping (not shown). Impeller nut 24 is then removed and impeller 22 may then be removed from the assembly. Removal of the volute housing and impeller exposes the interior of back plate 16 for access to the area of counterbore 47.

Utilizing access between arms 42, bolts 72 and spacers 102 are inserted in the package seal 2 which is being replaced to integrate outer member 60 and inner sleeve member 88. Bolts 49, which secure enlarged flange 64 of outer member 60 are then removed. Seal package 2 may then be slid axially off the free end 23 of shaft 4.

To install a new package seal, the removal steps are reversed. A package seal 2, comprising an outer body 60, inner sleeve member 88 and appropriate internal sealing components, is connected together with spacers 102 and bolts 72. The package seal 2 is slid over the free end 23 of shaft 4. "O" ring 66 is disposed on flange 64, which is then urged into counterbore 47 to form a fluid tight seal between flange 64 and flange 44 of back plate 16. Bolts 49 are then inserted through holes 48 from the exterior of back plate 16 and flange 64 is secured within counterbore 47. Bolts 72 and tabs 102 are then removed.

The impeller 22 is then reassembled onto free end 28 of shaft 4. The volute housing is again secured to bearing housing 14 utilizing bolts 40 to establish a fluid tight seal at peripheral flange 37 of back plate 16. The volute housing is reconnected to base plate 32. Inlet and discharge piping is reassembled onto pump assembly 6 to complete the reassembly.

Disassembly for purposes of replacement of package seal 2 can be accoplished with equal facility by removing the motor and the bearing housing 14 rather than volute housing 8. With this procedure, disassembly of inlet and outlet piping is unnecessary.

To accomplish disassembly, the motor is uncoupled from shaft 4 and removed from base plate 32. Bolts 40 are removed and bearing housing 14 disconnected from base plate 32. With bolts 40 removed, the bearing housing 14, shaft 4, seal package 2, back plate 16, and impeller 22 may be removed from volute housing 8 as a unit. Upon such removal, impeller nut 24 may be removed and impeller 22 removed from shaft end 23 to provide access to package seal 2. Bolts 49 are then removed to permit disassembly of the package seal 2 from back plate 16 and shaft 4. Installation of a new package seal 2 is accomplished as previously described, and the pump components are then reassembled.

The package seal of the present invention offers advantages in the ease of installation and removal of the seal, advantages associated with the unique configuration of the package seal that allows for installation and removal from the free end of the shaft. Because the package seal is installed from the free end of the rotatable shaft, it is not necessary to remove the shaft from the bearing housing or disturb alignment of the bearing housing and motor.

Additional modifications and/or additions may be included by those skilled in the art without departing from the scope of the invention as defined by the claims.

I claim:

1. A seal package containing the components for providing a fluid tight seal between a rotatable shaft and a housing suitable for installation as a unit over an end of the shaft which terminates interiorly of the housing, said package comprising, inner and outer, generally concentric, cylindrical members for sealing the space between the rotatable shaft and the housing, removable means to temporarily connect said cylindrical members for installation, mechanical seal components housed within said cylindrical members adapted for respective connected to the shaft and to the housing to provide a fluid tight seal therebetween, said outer cylindrical member having a flange at one end thereof for affixing said package to the housing and said inner member adapted to sealingly engage the shaft, said flange defining a radial surface adapted to engage a mating surface formed on the interior of the housing said surface facing toward the end of said cylindrical member opposite said end having said flange formed thereon, said outer cylindrical member having a diameter sized to permit passage thereof through said space between said housing and said shaft.

2. A package seal as claimed in claim 1 wherein said, removable connecting means for locking said inner and outer cylindrical members in position for shipping the unit as a package includes spacer means positioned between said inner and outer members and removable screw means extending from said outer member through said spacer means and into said inner member.

3. A package seal as claimed in claim 1 wherein said flange includes an annular peripheral surface and a groove formed therein, said groove adapted to receive an "O"-ring to provide a stationary secondary seal between said flange and the housing.

4. A package seal as claimed in claim 3 wherein said outer cylindrical member includes a portion at the end opposite from said flange having a diameter smaller than the diameter of said outer cylindrical member, said latter portion defines means for receiving said screw means and being sized such that when screw means extend from said outer member, through said spacer members into said inner member, said screw members may pass between said shaft and said housing on translation of said package along the shaft.

5. In a fluid containing housing defining an interior cavity and having at least one radial wall with a bore extending therethrough, a rotatable shaft extending into said cavity through said bore and defining a space therebetween and including an end terminating in said cavity, an improved seal package comprising, inner and outer generally concentric cylindrical members for sealing the space between said rotatable shaft and said bore in said wall, said outer cylindrical member having a flange at one end thereof for affixing said seal package to said wall interiorly of said cavity removable means to temporarily connect said cylindrical members for installation, mechanical seal components housed within said cylindrical members adapted for respective connection to the shaft and to the wall to provide a fluid seal therebetween, said inner member adapted to sealingly engage the shaft and rotate therewith, said flange defining a radial surface adapted to engage a mating surface on said wall interiorly of the housing said surface facing toward the end of said cylindrical member opposite said end having said flange formed thereon, said outer member having a diameter sized to permit passage thereof through said space between said housing and said bore.

6. In a fluid containing housing as claimed in claim 5 wherein said, removable connecting means for locking said inner and outer cylindrical members in position for shipping the unit as a package, includes spacer means positioned between said inner and outer members and removable screw means extending from said outer member through said spacer means and into said inner member.

7. In a fluid containing housing as claimed in claim 5 wherein said wall includes a counterbore formed therein surrounding said bore through which said shaft extends, and said flange includes an annular peripheral surface and a groove formed therein and an "O"-ring disposed in said groove engaging said counterbore to provide a stationary secondary seal between said flange and said wall, said flange being removably disposed in said counterbore.

8. In a fluid containing housing as claimed in claim 7 wherein said wall has apertures formed therein to receive securing means to secure said flange to said wall, and securing means extending through said wall from the exterior of said wall securing said flange to said wall.

9. In fluid containing housing as claimed in claim 8 wherein said housing is a volute housing of a centrifugal pump, and said wall is a back plate, and said shaft end terminating in said cavity is removably connected to a pump impeller, and wherein said inner cylindrical member is sized to pass over said end of said shaft.

10. In a fluid containing housing as claimed in claim 9 wherein said connecting means for locking said inner and outer cylindrical members in position for shipping the unit as a package, includes spacer means positioned between said inner and outer members and removable screw means extending from said outer member through said spacer means and into said inner member, and wherein said outer cylindrical member includes a portion at an end opposite from said flange having a diameter smaller than the diameter of said outer cylindrical member, and said latter portion defines means for receiving said screw means and being sized such that when said screw means extend from said outer member, through said spacer member into said inner member, said screw means may pass between said shaft and said bore on translation of said package seal along the shaft.

11. A package seal as claimed in claim 1 wherein said package seal includes at least one seal ring connected to said outer cylindrical member and at least one seal ring connected to said inner cylindrical member, said seal rings defining relatively rotating seal faces in sealing contact with each other and being of equal outer diameter.

12. In a fluid containing housing as claimed in claim 5 wherein said package seal includes at least one seal ring connected to said outer cylindrical member and at least one seal ring connected to said inner cylindrical member, said seal rings defining relatively rotating seal faces in sealing contact with each other and being of equal outer diameter.

* * * * *